Aug. 10, 1965 R. J. HUSBAND 3,200,301
TIMED CYCLE CIRCUIT
Filed May 11, 1962
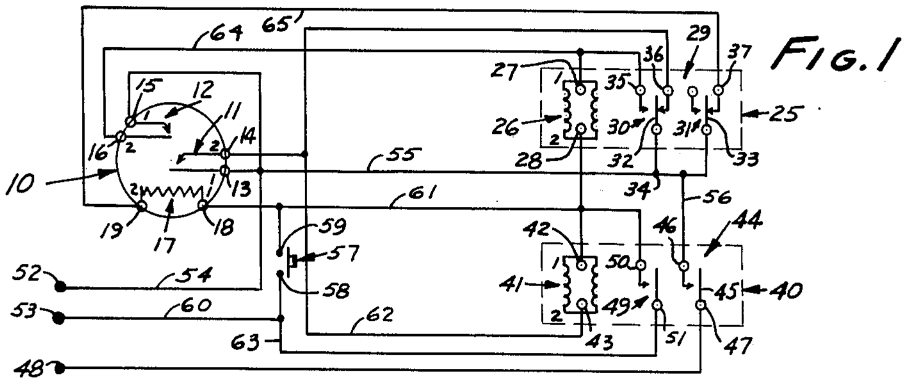
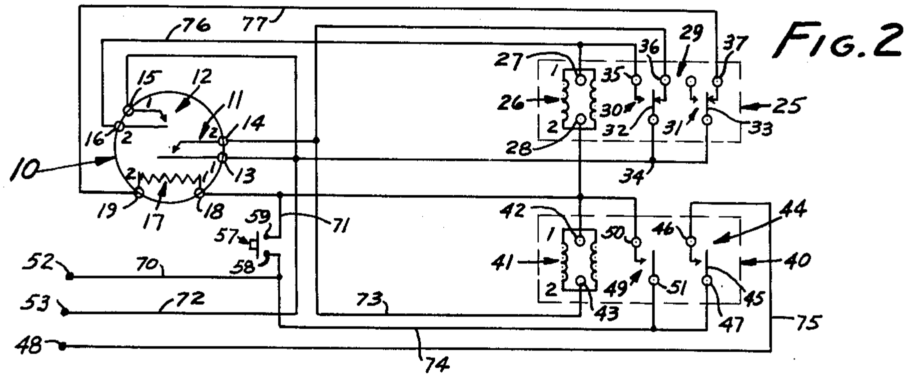
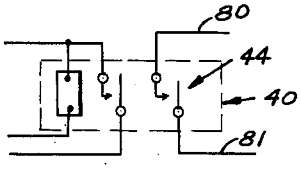
FIG. 3
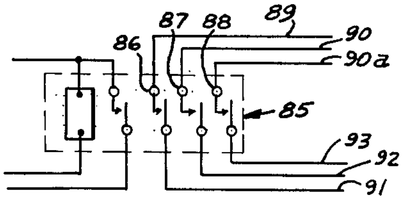
FIG. 4
FIG. 5
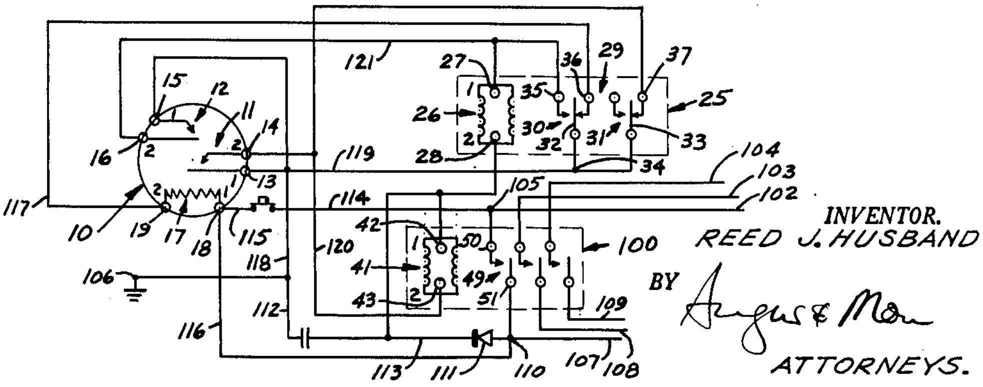
INVENTOR.
REED J. HUSBAND
BY Angus & Mon
ATTORNEYS.

United States Patent Office 3,200,301
Patented Aug. 10, 1965

3,200,301
TIMED CYCLE CIRCUIT
Reed J. Husband, 650 Carroll Way, Pasadena, Calif.
Filed May 11, 1962, Ser. No. 194,103
8 Claims. (Cl. 317—141)

This invention relates to timing circuits.

There is a wide range of applications for simple electrical circuits which can control the application of power to some other device, and determine the length of time the power is applied. Vending machines, and flush toilets for aircraft and buses, are examples of such applications.

It is desirable that no skill, alertness, judgment, or knowledge be required on the part of the user, when a timed device is operated. Therefore, the circuit must provide the desired function merely upon its receiving a signal to start. In fact, such a circuit, to be most effective, ought to be insensitive to any but a starting signal, and then be insensitive to subsequent signals which might be given during the cycle, so that the cycle cannot be interrupted or extended by the user. Another desirable feature would be for the circuit to be incapable of being kept in operation by holding down the starter button, but instead for it to shut itself down until the starter button is released between cycles.

For example, some previously known aircraft and bus flush toilets which operated on fixed timed cycles have suffered from the disadvantage that a user could hold the starter switch closed and continue the device in operation for an indefinite period. Then the components would heat up until the device failed to operate.

To accomplish the above features, circuits have been made more sophisticated, usually by inserting more components to carry out the functions, which components themselves provided still more elements to go wrong in devices which ought to be kept as simple as possible.

It is an object of this invention to provide a simple control circuit which is made up of only a minimum number of parts, and whose operation is independent of extraneous signals and is therefore proof against meddling and tampering by users.

A timed cycle circuit according to the invention includes a pair of relays, one of which controls application of power to a using device, and the other of which provides means for ascertaining that the device shuts down after each cycle and remains shut down until the starter switch is once again opened and closed.

The invention will be fully understood from the following detailed description and the accompanying drawings in which:

FIGS. 1 and 2 are circuit diagrams of embodiments of the invention;

FIGS. 3 and 4 are circuit diagrams of alternate elements which can be used in the circuits of FIGS. 1 and 2; and FIG. 5 is a circuit diagram of still another embodiment of the invention.

FIG. 1 is the presently preferred embodiment of the invention and is designed to operate on direct current. The circuit includes a tube 10 which includes a first and a second delay switch means 11, 12, respectively. The first delay switch means has a first and a second terminal 13, 14, respectively. The second delay switch means has a first and a second terminal 15, 16, respectively. In this tube, as in the other circuit components, small numerals 1 and 2 are provided in addition to the principal numbers for convenience in correlating the specification and the claims.

Tube 10 also includes an actuator means 17 having first and second terminals 18, 19, respectively. In this example, the actuator means comprises a heater coil adapted to heat delay switch means 11 and 12. Delay switch means 11 and 12 are normally open. They are closed by heat provided by the actuator means. A suitable example for tube 10 is GV Controls tube DM7362, in which switch means 11 closes in one second, and switch means 12 closes in five seconds. Both switches reopen in five seconds after the current to the heater is cut off. The period of the cycle is ten seconds, which is the total of the length of time it takes switch means 12 to close, and switch means 11 to reopen.

A first relay 25 includes a coil 26 having first and second terminals 27, 28, respectively. The first relay also includes selector switch means 29, the selector switch means including a first and second switch 30, 31, the switches having respective contactors 32, 33, which assume the illustrated condition when coil 26 is not energized. These switches have a common terminal 34. Switch 30 includes a first relay latch terminal 35 and a second relay power terminal 36. Switch 31 includes a heater power terminal 37.

It will be observed that in the first condition (shown in FIG. 1) of the first relay, the contactors make contact with the second relay power terminal and the heater power terminal. The other condition of the first relay involves contact only with the first relay captive terminal.

A second relay 40 is provided which includes a coil 41 with a first and second terminal 42, 43. It includes control switch means 44, a first condition of which is illustrated in FIG. 1, which is that which occurs when the coil is not energized. The control switch means includes output power control means comprising a switch 45 having a first and a second terminal 46, 47, respectively. Terminal 47 is connected to an output connection 48.

The control switch means also includes second coil latching means constituting a switch 49 having a first and second terminal 50, 51. An input and a return terminal 52, 53, respectively, are provided for input of one side of the D.C. power and for ground, respectively. The output connection is adapted to be connected to a motor or some other device to be powered under the control of the illustrated circuit.

A lead 54 connects input terminal to the first terminals of both delay switch means and through lead 55 to the common terminal of the selector switch means. Lead 56 branches from lead 55 and connects to the first terminal of switch 45.

A starter switch 57, having first and second terminals 58, 59, is connected between lead 60 and the first terminal 18 of the actuator means 17. The same side of the starter switch is connected by lead 61 to the second terminal of first coil 26 and the first terminal of second coil 41. It is also connected to the first terminal of switch 49. Lead 60 is connected to the return terminal 53. The second terminal of the second coil 41 is connected by lead 62 to the second terminal 14 of the first delay switch means and also to second relay power terminal 36. The second terminal of switch 49 is connected by lead 63 to lead 60, and thus to the return terminal and one side of the starter switch. Second terminal 16 of the second delay switch means is connected by lead 64 to the first terminal of first coil 26 and to first relay latch terminal 35.

Second terminal 19 of actuator means 17 is connected by lead 65 to heater power terminal 37.

The circuit of FIG. 2 will now be described. It will initially be observed that the three circuit components in this circuit are identical in every respect to those in FIG. 1 and that, in general, the circuit connections also are substantially identical. The difference between their connections arises from the fact that the embodiment of FIG. 1 is started by making a ground connection though the starter switch, and that in the embodiment of FIG. 2, it is started by completing a circuit between the actuator means and the input terminal. Appropriate modification of the circuitry is therefore called for and, as a matter of convenience, the leads will be called out individually in this connection with this embodiment, but the components will bear the same numerals as in FIG. 1.

The first terminal of starter switch 57 is connected to a lead 70 that is connected to the input terminal. The other terminal of the starter switch is connected by branches of lead 71 to the first terminal of the actuator means to the second terminal of the first coil, the first terminal of the second coil and to the first terminal of switch 49.

Lead 72, through its branches, connects return terminal 53 to the first terminals of both delay switch means and to common terminal 34 of the selector switch means. Lead 73 connects second terminal of the second coil 41 through branches to the second terminal of the first delay switch means, and to the second relay power terminal 36.

Lead 74 connects second terminals of switches 45 and 49 to lead 70, and thus to the return teminal. Lead 75 connects the first terminal of switch 49 to output terminal 48. Lead 76 connects the second terminal of second delay switch means 12 to the first terminal of first coil 26 and to first relay latch terminal 35. Lead 77 interconnects second terminal 19 of the actuator means to heater power terminal 37.

In FIGS. 1 and 2, as will later be seen, the power to be transmitted to the output connection is derived from the input terminal. However, it may be desirable to modify the construction so that the power is derived from a separate source than the power for the control itself. FIG. 3 shows second relay 40 with its first terminal connected to a lead 80, which lead is adapted to be connected to some power source. Lead 81 is connected to the output connection. The remainder of the circuits of FIGS. 1 and 2 would be the same when this separate power source is used.

FIG. 4 shows an extension of the arrangement shown in FIG. 3 wherein a relay 85 of the type which may be substituted for the second relay in either of FIGS. 1 and 2 adapted to handle three phase A.C. current, or control more than one circuit. It includes three switches 86, 87, 88 for controlling power supplied by leads 89, 90 and *90a* to output leads 91, 92, 93. Thus, the second coil and its associated switch 45 may be utilized to control any number of power control switches for any number of circuits or devices or phases.

FIG. 5 shows still another embodiment of the invention utilizing a tube 10, a first relay 25 and a second relay 100 which differs from second relay 40 only by its inclusion of an extra power control switch 101. This is the preferred embodiment of circuit for utilizing alternating current both for the control current and for the output. Three leads 102, 103, 104 constitute an input supply of three phase power and, for purposes of the control circuit, terminal 105 may be considered an input terminal equivalent to input terminal 52. Terminal 106 may be considered the equivalent of return terminal 53 for the control portion of the circuit. Three leads 107, 108, 109 provide a three phase output. Terminal 110 may be considered the equivalent of the output connection 48 in the other embodiments.

This embodiment is inherently similar to that of FIG. 2 in that the starter switch applies current to the actuator means and to the second coil. For the purposes of the actuator means, alternating current will function as well as direct current. For the relays, however, direct current is needed, and therefore a rectifier 111 is connected to the second terminal of switch 49 between that switch and the first terminal of the second coil. A condenser is connected in lead 112 between lead 113 and return terminal 106.

The starter switch is connected by lead 114 to input terminal 105. The other terminal of the starter switch is connected by lead 115 to the first terminal of the actuator means, and by lead 116 to output terminal 110, and thereby to rectifier 111.

The second terminal of the actuator means is connected by lead 117 to the second relay power terminal 36. Lead 118 connects return treminal 106 to the first terminals of both delay switch means and also through a branch lead 119 to the common terminal 34. Lead 120 interconnects the second terminal of the second coil 41 to the second terminal of first delay switch means 11 and, through a branch, to heater power terminal 37. Lead 121 connects the second terminal of second delay switch means 12 to the first terminal of first coil 26, and to first relay latch terminal 35.

The operation of the circuit in FIG. 1 will now be described. In its illustrated condition, it is in repose awaiting a signal to start, and then to operate a device connected to the output connection 48, which device itself will be grounded or connected to the return terminal 53 in order to complete its own circuit.

To start the device, starter switch 57 is closed. The effect of this closure is to complete a circuit from input terminal 52 through leads 54 and 55 through switch 30, second relay power terminal 36, and lead 62 through second coil 41, lead 61 through the starter switch, and lead 60 to return terminal 53. It will be observed, therefore, that the purpose of the starter switch is to provide a ground for the second coil, energizing the same and causing the output power control means and second coil latching means, that is, switches 45 and 49, to close. Closure of switch 49 completes a ground circuit for second coil 41 from its first terminal through leads 63 and 60 to the return terminal. The second coil is therefore latched or captive by a switch 49 and will remain so as long as current is supplied to it.

The closure of the starter switch has a second effect, which is to create a ground circuit for actuator means 17, that is, the heater for the delay switch means. This circuit is completed from input terminal 52 through leads 54, 55, switch 31, heater power terminal 37, lead 65 through the actuator means to and through the starter switch and lead 60 to the return terminal. Closure of switch 45 creates an alternate ground circuit for the actuator means through lead 61, switch 49, and leads 63 and 60. Therefore, opening the starter switch will have no effect on the continuing operation of the circuit once the second relay is energized.

Energizing the heater means causes delay switch means 11 and 12 to heat up. First delay switch means 11 is the first to close, its closure taking place in one second or less. Its closure completes a circuit from input terminal 52 through lead 54, through the first delay switch means from terminal 13 to terminal 14 and then through lead 62 to second coil 41. This provides an alternate source of input energy to the second coil which will continue second coil 41 in its energized condition so long as delay switch means 11 remains closed, no matter what is the condition of switch 30, through which the second coil initially received its energy. Additional heating of the second delay switch means closes delay switch means 12, preferably in about five seconds. This completes a circuit from input terminal 52 through lead 54 through switch means 12 from its first to its second terminal, through lead 64 to coil 26 and first relay latch terminal 35. The first coil has a ground circuit completed through switch 49, and leads 63 and 60. Therefore, closing delay switch means 12 actuates the first relay, disconnecting second relay power terminal 36 from the input, and also disconnecting the actuator means by opening switch 31. It will be observed that the closure of delay switch means 12 by the heater causes a positive cut off of power to the heater, because the effect of the heater is through the relay to cut itself off. Therefore, this device will not stay locked into operating condition because of overheating of tube 10. This means that switch means 11 and 12 are certain to open, preferably in about five seconds, making the total cycle ten seconds. Different closing and opening rates may be provided to change the period of the cycle. As soon as the delay switch means open, the second relay is de-energized and switched back to the illustrated condition, because its two sources of power are both disconnected, the first because switch 30 is switched off terminal 36, and the second because delay switch means 11 will be open. The second relay is certain to be de-energized before the first relay, because the second relay is held energized by its own latch circuit through terminal 35 until its ground circuit through switch 45 is broken. Therefore, regardless of the order in which delay switch means 11 and 12 open, the second relay is certain to become de-energized first, thereby making certain that the circuit shuts down after each operation.

The unit is also proof against being held in continued operation by a person merely holding the starter switch closed, because were the starter switch to be held closed, the cycle will proceed until both delay switch means are closed. Then tube 10 will reliably be de-energized because of the action of the first relay in cutting off the heater means, and the delay switch means will both open. The result of holding the starter switch closed is to keep an energizing circuit closed through the second coil from input terminal 52 through leads 54, 55, through switch 30 at terminal 35, through the coil from its first to its second terminal, through lead 61 through the starter switch and lead 60 to return terminal 53. This keeps the first relay actuated, but the second relay is deactuated, because its two circuits for receiving power are closed because the first relay is still energized, which prevents the current from passing through second relay power terminal 36, and also because the continuing actuation of the first relay prevents the heater from getting power. Therefore, the actuated device will be shut down and the only effect of keeping the starter switch closed is to keep the first relay energized. The circuit therefore cannot start again until the starter switch is released and pressed again.

Closing the starter switch during the operation of the cycle will have no effect on a continuation of the cycle, nor on restarting it. Therefore, this circuit is insensitive to extraneous additional signals and is proof against being held in steady operation by a user who meddles with it.

The operation of the circuit of FIG. 2 is substantially similar, except in this case, the starter switch is connected on the power side of the circuit instead of on its ground side. Closure of the starter switch in FIG. 2 applies energy to the actuator means as before and also serves to actuate the coil by current passed from lead 71 to lead 73 through switch 30 and lead 72 to return terminal 53. Energizing the second coil closes switch 30 to provide potential at the first terminal of the coil and latch it into operation.

Subsequent closure of the first delay switch means creates an alternate ground circuit through switch means 11 to lead 72 and the return terminal.

Subsequent closure of delay switch means 12 creates a ground circuit for the first coil which is connected to the input terminal through switch 30 so that the first coil is energized, thereby de-energizing the heater and cutting off one of the ground circuits for the second coil. Opening of both the delay switch means will de-energize the circuit as stated before.

A person holding the starter switch closed will be unable to keep the device in operation, because it will merely serve to apply current to the second terminal of the first coil, which will keep the first relay energized through its latch circuit in switch 30 until the starter switch is released, but during this time, this same energization of the first relay assures that the second relay will remain de-energized and that the devices controlled by it will remain idle.

FIG. 3 illustrates that additional switches can be placed in the second relay so that instead of deriving the energy for operating the controlled device from the input terminal, the control circuit can be operated on one source of current, and the switch utilized to control flow from another source.

FIG. 4 illustrates the same feature as FIG. 3 with the exception that it is set up for controlling more than one circuit or perhaps three leads of a three-phase circuit.

The operation of the circuit in FIG. 5, which is shown in its repose condition, is substantialy the same as that of FIG. 2 with the exception that it utilizes alternating current exclusively, while the previously described devices are shown operating on direct current. The relays require direct current for their actuation, while the heater can operate on either A.C. or D.C.

Current is supplied at input terminal 105 and the starting signal is created by closing the starter switch, thereby forming a circuit through leads 114, 115, through the heater, and lead 117 through terminal 36, leads 119 and 118 to return terminal 106. This starts the heating of tube 10.

Another circuit is made from the starter switch through lead 116, terminal 110 through rectifier 111 to second coil 41 through lead 120, switch 31, leads 119, 118 to return terminal 106, thereby energizing the second coil and closing switch 49. This is a latching action, current being supplied from the switch through the rectifier to the coil. Subsequent closure of the first delay closure of the first delay switch means creates an alternate circuit to ground for the second coil.

Subsequent closure of the second delay switch means provides a ground circuit for the first coil through lead 118. This serves to cut off the heater circuit as before. Therefore, it will be observed that, with the exception of power supply, the circuit of FIG. 5 is substantially identical to that of FIG. 2, as is its operation relative to manipulation of the starter switch.

This invention thereby provides simple circuitry utilizing but three circuit components capable of maintaining a sophisticated, carefully controlled, timed operation on a device, which is proof against tampering by a user.

It is evident that other types of delay switch means and actuators than those illustrated can be used, and that they can be separate instead of integral units. For example, two individual thermally actuated switches can be used with separate heaters, the heaters being in series connection. Also, types of timer actuators other than heaters can be used, the essential feature being a switch which opens and closes in precise periods of time by actuation exerted by an actuator. However, the device shown is commercially available and convenient to use, and is the preferred embodiment.

This invention is not to be limited by the embodiments shown in the drawings and described in the description which are given by way of example and not of limitation, but only in accordance with the scope of the appended claims.

I claim:

1. A timed cycle circuit comprising: a first and a second delay switch means, each having a first and a second terminal; actuator means for said delay switch means having a first and a second terminal; a first relay comprising a first coil having a first and a second terminal, and selector switch means actuable by energizing said first coil, said selector switch means including a common terminal, a contactor in continuous connection with the common terminal, and a first relay latching terminal, a second relay power terminal, and a heater power terminal, the contactor being selectively switchable between contact with the first relay latch terminal in one condition of the coil, and contact with the second relay power terminal and the heater power terminal in another condition of the coil; a second relay comprising a second coil having a first and a second terminal, and control switch means actuable by energizing said second coil, said control switch means including output power control means and second coil latching means; and a starter switch having a first and a second terminal adapted to be connected to complete a circuit therethrough; said first and second delay switch means being adapted for sequential actuation in that order by the actuator means, whereby to establish the duration of the cycle; an input terminal and a return terminal; conductive connections between one of said last-named terminals and the actuator means, the control switch means, the second and first terminals of the first and second coils, respectively; the starter switch being disposed between the selected one of said input and return terminals and the actuator means, the second coil latching means being conductively connected to the first coil in parallel connection with the starter switch; the other of said input and return terminals being connected to the first terminals of both delay switch means, and to the common terminal of the selector switch means; the second terminal of the second delay switch means being conductively connected to the first terminal of the first coil and to the first relay latching terminal; the second terminal of the first delay switch means being conductively connected to the second relay power terminal and to the second terminal of the second coil; the other terminal of the actuator means being conductively connected to the heater power terminal; said control switch means being adapted to interconnect an input and an output connection while the second coil is in the condition wherein the second coil latching means controls the second coil; and whereby closing the starter switch energizes the actuator means, causes the second coil to assume one of its conditions and causes the second coil latching means to latch said second coil in said condition, and causes the control switch means to pass power to the output connection, subsequent actuation of the first delay switch means providing a second circuit for said second coil, subsequent actuation of the second delay switch means causing the first coil to change its condition, thereby deactuating the actuator means, enabling the delay switch means to return to their previous condition, latching the first coil, and unlatching the second coil, thereby opening the control switch means, and opening the latching circuit of the first coil.

2. A timed cycle according to claim 1 in which the delay switch means each comprises a thermally actuable normally open switch, and in which the actuator means is a heater adapted to heat the delay switch means to close the same, the second delay switch being the second to close.

3. A timed cycle control circuit according to claim 1 in which the said one of the last-named terminals which is connected to the actuator means is the return terminal, and in which the starter switch is connected between them.

4. A timed cycle circuit according to claim 3 in which the delay switch means each comprises a thermally actuable normally open switch, and in which the actuator means is a heater adapted to heat the delay switch means to close the same, the second delay switch being the second to close.

5. A timed cycle circuit according to claim 1 in which the said one of the last-named terminals which is connected to the actuator means is the input terminal, and in which the starter switch is connected between them.

6. A timed cycle circuit according to claim 5 in which the delay switch means each comprises a thermally actuable normally open switch, and in which the actuator means is a heater adapted to heat the delay switch means to close the same, the second delay switch being the second to close.

7. A timed cycle circuit according to claim 1 in which the said one of the last-named terminals which is connected to the actuator means is the input terminal, and in which the circuit is adapted to utilize alternating current by the inclusion of a rectifier connected between the output side of the output power control means and the first terminal of the second coil, and in which a condenser is connected between the rectifier and the said first terminal of the second coil and the return terminal.

8. A timed cycle circuit according to claim 7 in which the delay switch means each comprises a thermally actuable normally open switch, and in which the actuator means is a heater adapted to heat the delay switch means to close the same, the second delay switch being the second to close.

References Cited by the Examiner

UNITED STATES PATENTS 2,999,191 9/61 Muradian et al. ------- 317—141

SAMUEL BERNSTEIN, *Primary Examiner.*